No. 711,618. Patented Oct. 21, 1902.
H. N. COVELL.
WINDING ENGINE.
(Application filed Mar. 2, 1900.)
(No Model.) 2 Sheets—Sheet 1.

No. 711,618. Patented Oct. 21, 1902.
H. N. COVELL.
WINDING ENGINE.
(Application filed Mar. 2, 1900.)
(No Model.) 2 Sheets—Sheet 2.

UNITED STATES PATENT OFFICE.

HARRY N. COVELL, OF BROOKLYN, NEW YORK, ASSIGNOR TO THE LIDGER-WOOD MANUFACTURING COMPANY, OF NEW YORK, N. Y., A CORPORATION OF NEW YORK.

WINDING-ENGINE.

SPECIFICATION forming part of Letters Patent No. 711,618, dated October 21, 1902.

Application filed March 2, 1900. Serial No. 7,077. (No model.)

*To all whom it may concern:*

Be it known that I, HARRY N. COVELL, a citizen of the United States, and a resident of the city of New York, borough of Brooklyn, Kings county, and State of New York, have invented a new and useful Improvement in Winding-Engines, of which the following is a specification.

My invention relates to an improvement in devices for connecting two sets of friction driving devices by which a drum or other similar device is turned in opposite directions, so that a single lever may be used for throwing both friction devices into and out of operation.

My device comprises the novel features which will be hereinafter described, and particularly pointed out in the claims.

Figure 1:
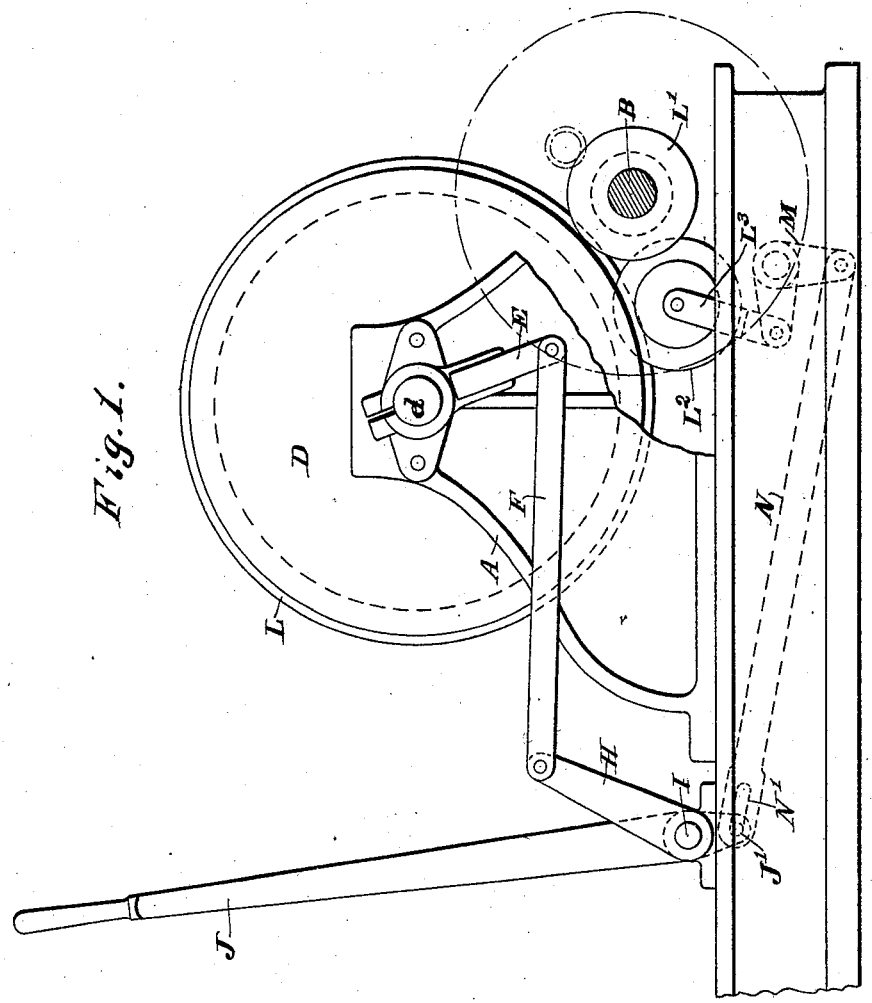
Figure 2:
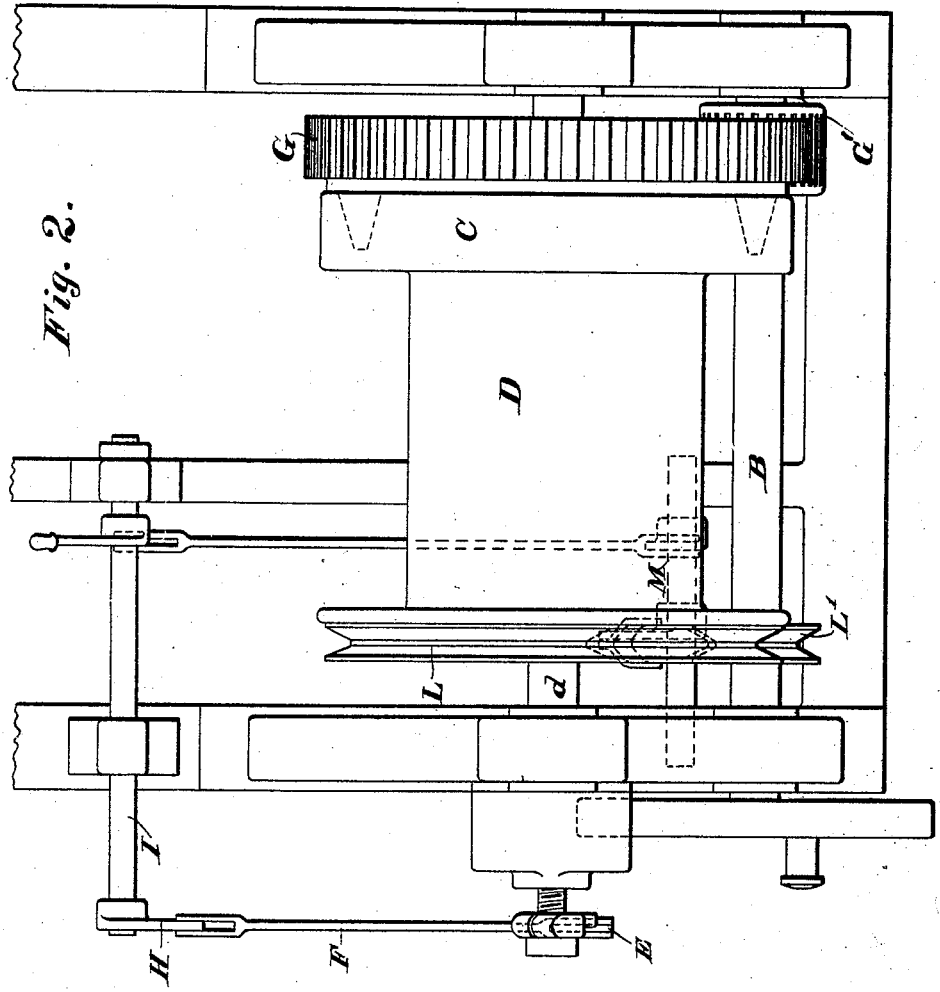

Figure 1 is a side elevation of my device applied to a drum. Fig. 2 is a plan view of the same.

The drum D is mounted upon a shaft $d$, which is mounted within suitable journals carried by the frame A. This drum at one end is provided with any of the ordinary friction driving devices by means of which power is applied for winding up a cable. This friction device is not herein shown in detail, as my invention does not lie in the details of this part of the mechanism. The friction device would be included in the portion C, lying at one end of said drum, a well-known form being indicated by dotted lines in Fig. 9, and serves to connect the drum and the large gear-wheel G, which gear-wheel is secured to the shaft $d$. The wheel G meshes with a pinion G' upon the shaft B, which may be the engine-shaft or a shaft driven by any form of power connection. The friction clutch just mentioned is operated in accordance with the usual practice by means of an arm E, which is at the opposite end of the drum. This arm is connected by means of a link F with an arm H, which in turn is secured to a rock-shaft I. To this rock-shaft is secured the operating-lever J, which has an extension beneath the shaft I. Upon one end of the drum D is secured a friction-wheel L, which is herein shown as being provided with a V-groove in its periphery. Upon the shaft B is secured a friction-wheel L', which is also provided with a V-groove in its periphery. An idler friction-wheel $L^2$ has its periphery formed in the shape of a letter V or beveled so as to fit within the grooves in the two wheels L and L'. This wheel is carried within the bifurcations of a bar $L^3$, which is pivoted to one end of a bell-crank lever M. This bell-crank lever is connected by means of a rod N with the lower extension of the operating-lever J. The device for operating the driving friction device C is so constructed that a movement of the lever J toward the left, as seen in Fig. 1, will apply the friction-clutch and cause the drum D to turn, so as to wind up the cable. This movement will permit the idler friction-wheel $L^2$ to drop, so as to disconnect the friction-wheels L and L'. A movement of the operating-lever J toward the right, as seen in Fig. 1, will release the friction device C and cause a disconnection of the power from the drum. Such movement at the beginning of its operation will have no effect upon the idler friction-wheel $L^2$, as the end of the link or rod N, which is connected with the operating-lever J, is provided with a slot N', which embraces a pin J' upon the operating-lever J. As soon, however, as the pin J' engages the end of the slot, which would occur subsequent to the release of the main friction driving device, the idler-wheel $L^2$ is raised, so as to engage the two wheels L' and L, and power is thus applied to the drum to reverse it. It will thus be seen that a movement of the lever J to one side of its central position will apply one of the friction driving devices, while a movement of the lever to the other side of the central position will apply the other friction driving device. A single lever is thus used for operating both friction mechanisms, and a continuous movement of the lever from one extreme position to its other extreme position will first release one of the friction driving devices and then apply the other friction driving device. This simplifies the construction of the machine and its operation in use.

The particular form of friction driving device used for this purpose is not material. I have herein shown in detail one form of friction driving device; but I do not wish to be limited to that or any other particular form.

I claim—

1. In a hoisting-engine the combination with a power-shaft, a drum-shaft, rotative connection between said shafts, a drum loose upon its shaft and a friction device for connecting the drum with its shaft, of friction-disks upon drum and power shafts, an idler friction-disk adapted to be moved into engagement with both the other friction-disks, an operating-lever and connections from said lever to both sets of friction driving mechanisms to operate them oppositely.

2. In a hoisting-engine the combination with a power-shaft, a drum-shaft, rotative connection between said shafts, a drum loose upon its shaft, a friction device for connecting the drum with its shaft, and an actuating-lever therefor, of friction-disks upon drum and power shafts, an idler friction-disk, a pivoted lever supporting said idler-disk and adapted to swing it into engagement with both the other friction-disks, an operating-lever, and links connecting said operating-lever with both the friction operating-levers to operate them oppositely.

HARRY N. COVELL.

Witnesses:
CHAS. C. PIERCE,
CHAS. G. MUNIER.

Correction in Letters Patent No. 711,618.

It is hereby certified that in Letters Patent No. 711,618, granted October 21, 1902, upon the application of Harry N. Covell, of Brooklyn, New York, for an improvement in "Winding-Engines," an error appears in the printed specification requiring correction, as follows: In lines 32-33, page 1, the abbreviation and numeral "Fig. 9" should read *Fig. 2;* and that the said Letters Patent should be read with this correction therein that the same may conform to the record of the case in the Patent Office.

Signed and sealed this 28th day of October, A. D., 1902.

[SEAL.]

F. I. ALLEN,
*Commissioner of Patents.*